R. F. McKENZIE.
RIM EXPANDER AND CONTRACTOR.
APPLICATION FILED MAR. 17, 1922.
1,434,786. Patented Nov. 7, 1922.
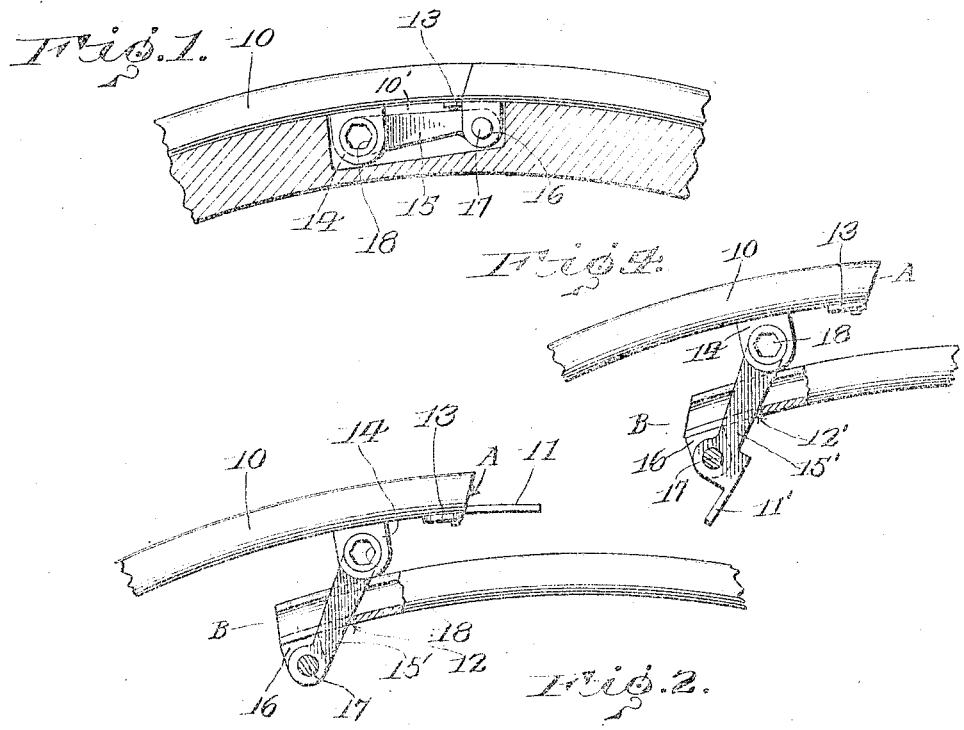
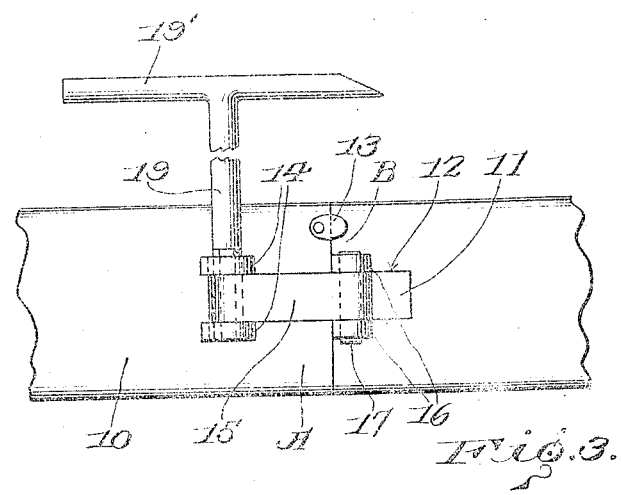
Robert F. McKenzie Patented Nov. 7, 1922.

1,434,786

UNITED STATES PATENT OFFICE.

ROBERT F. McKENZIE, OF SCOTTSVILLE, KENTUCKY, ASSIGNOR OF ONE-FOURTH TO GILBERT G. WILSON, OF SCOTTSVILLE, KENTUCKY.

RIM EXPANDER AND CONTRACTOR.

Application filed March 17, 1922. Serial No. 544,573.

*To all whom it may concern:*

Be it known that I, ROBERT F. MCKENZIE, a citizen of the United States, residing at Scottsville, in the county of Allen, State of Kentucky, have invented certain new and useful Improvements in Rim Expanders and Contractors; and I do hereby declare the following to be a full, clear, and exact description of the invention, such as will enable others skilled in the art to which it appertains to make and use the same.

This invention relates to new and useful improvements in rims and particularly to demountable tire rims.

One object of the invention is to provide means for easily and quickly opening or closing a split tire rim.

Another object is to provide a device for movably connecting the ends of a split tire rim, and which is adapted to be operated by a key to open or close the split, without the use of hammers, screwdrivers, or other tools which bend, knick, or otherwise damage the rim.

Other objects and advantages will be apparent from the following description when taken in connection with the accompanying drawing.

In the drawing:

Figure 1 is a side elevation partly in section of a rim equipped with the invention, the rim being shown in closed position and the felly in section.

Figure 2 is a side elevation of the same partly in section showing the rim open.

Figure 3 is a plan view, looking toward the inner face of the split portion of the rim, the rim being closed.

Figure 4 is a view similar to that shown in Figure 2, but showing a modification wherein the closing tongue is formed on the stem of the member 15'.

Referring particularly to the accompanying drawing, 10 represents a tire rim, of the demountable type, which is split, with one end formed with the central longitudinal tongue 11, for engagement in the recess or notch 12, in the other end of the rim. On the first end, which is designated A, there is mounted a pivoted button 13, for engagement by the end B, to hold the ends from springing past each other, after having been properly closed.

On the inner face of the end A there are formed the pair of transversely aligned apertured lugs 14, and rotatably supported in the apertures of the lugs are the ends of the head of the T-shaped member 15. The leg of the T-shaped member 15 adjacent its outer end is disposed between a similar pair of lugs 16, formed on the end B, at opposite sides of the recess 12, a pivot pin 17 being disposed through these lugs and the leg. In one end of the head of the T-shaped member 15 there is formed an angular socket 18 for the reception of the angular end of the key 19.

When the rim is to be opened, to permit the removal of a tire therefrom, the key is placed in the socket 18, and by grasping the transverse head or handle 19', of the key, and rotating the key, the T-shaped member 15 will be turned in the lugs 14, with the result that the outer end of the leg of said member will spring the end B, of the rim, inwardly past the end A, when the rim will contract to permit the tire being removed. After the tire has been replaced on the rim, the key is again used to turn the member 15 in the opposite direction, with the result that the ends A and B will be moved into abutting relation, after which the button 13 is rotated to engage with and hold the ends against movement.

By this construction all danger of injuring the rim and the tire is obviated, as no tools are used which would batter the rim, or slip into the tire casing and puncture the inner tube.

Furthermore, the lugs and the T-shaped member are adapted to seat in a depression in the outer face of the wheel felly, so that the tire rim will be held against creeping, as clearly seen at 10', in Figure 1.

In Figure 4 there is shown a modification of the invention, wherein the tongue 11', for closing the recess or opening 12, is formed integrally with the outer end of the stem of the T-shaped member 15'. It will be noted that this tongue 11' extends longitudinally from the end of the stem of the T-shaped member, opposite to that of the key socket end of the stem. By this construction, when the rim is opened, as shown in Figure 4, the tongue 11' will lie within the rim, and thus be removed from danger of being broken off.

What is claimed is—

1. A demountable rim comprising a split ring having a recess in one end, and a link movably connecting the ends of the ring and adapted to be rotated through said recess by a key to open and close the split.

2. A demountable rim comprising a split ring having a recess in one end, a link pivotally connected to the ends of the ring and extending across the split, one end of the link being formed with a key receiving socket whereby the link is capable of rotation through said recess to open and close the split of the ring.

3. A demountable rim comprising a split ring having an elongated recess in one end, a link pivotally connecting the ends of the ring, and means carried by the link for closing the said recess upon closing movement of the ends of the ring.

4. A demountable rim comprising a split ring having a recess in one end, an opening and closing link pivotally connected to the ends of the ring, and a tongue for closing the recess when the ring ends engage.

5. A demountable rim comprising a transversely split ring having an elongated recess in one end, spaced ears carried by the inner face of each end of the rim, a link pivotally connected to the ears, one end of the link having a key receiving socket, and a longitudinally extending elongated tongue arranged to enter and close said recess when the rim ends are engaged.

In testimony whereof, I affix my signature, in the presence of two witnesses.

ROBERT F. McKENZIE.

Witnesses:
  H. C. DIXON,
  R. R. PITCHFORD.